United States Patent [19]

Ouellette

[11] 4,186,374

[45] Jan. 29, 1980

[54] TRANSDUCER HOUSING WITH RELEASE MECHANISM

[75] Inventor: Charles W. Ouellette, Portsmouth, R.I.

[73] Assignee: Raytheon Company, Lexington, Mass.

[21] Appl. No.: 866,889

[22] Filed: Jan. 3, 1978

[51] Int. Cl.[2] .............................................. H04B 13/00

[52] U.S. Cl. .............................................. 367/7; 9/8 R

[58] Field of Search ........................ 340/2, 8 S; 9/8 R; 220/260, 307

[56] References Cited

U.S. PATENT DOCUMENTS

| | | | |
|---|---|---|---|
| 3,074,671 | 1/1963 | Dinolfo et al. | 340/2 |
| 3,132,322 | 5/1964 | Maes | 9/8 |
| 3,220,600 | 11/1965 | Wojciechowski | 340/2 |
| 3,262,089 | 7/1966 | Proctor et al. | 340/2 |
| 3,377,615 | 4/1968 | Lutes | 340/2 |
| 3,646,505 | 2/1972 | Kirby | 9/8 |
| 3,708,812 | 1/1973 | Yapoudjian | 9/8 |
| 3,859,598 | 1/1975 | McElwain et al. | 340/2 |

*Primary Examiner*—Harold J. Tudor
*Attorney, Agent, or Firm*—David M. Warren; Joseph D. Pannone; Milton D. Bartlett

[57] ABSTRACT

A transducer housing for an air-dropped sonar transducer includes a smooth cylindrical case for stowage on board an aircraft. The case is formed with a separation device which permits ejection of the transducer from the case upon impact with the water of the ocean, the device being formed of tabs on the case and chamfers on a cover plate of the case. The impact of the water on the cover plate is directed by the chamfers against the tabs to spread them apart thereby releasing the cover plate and the transducer. Pins on the cover plate project through apertures in the tabs and press against the side of the apertures with a preset force to essentially lock the tabs to the plate until the preset force is overcome by the water impact.

4 Claims, 4 Drawing Figures

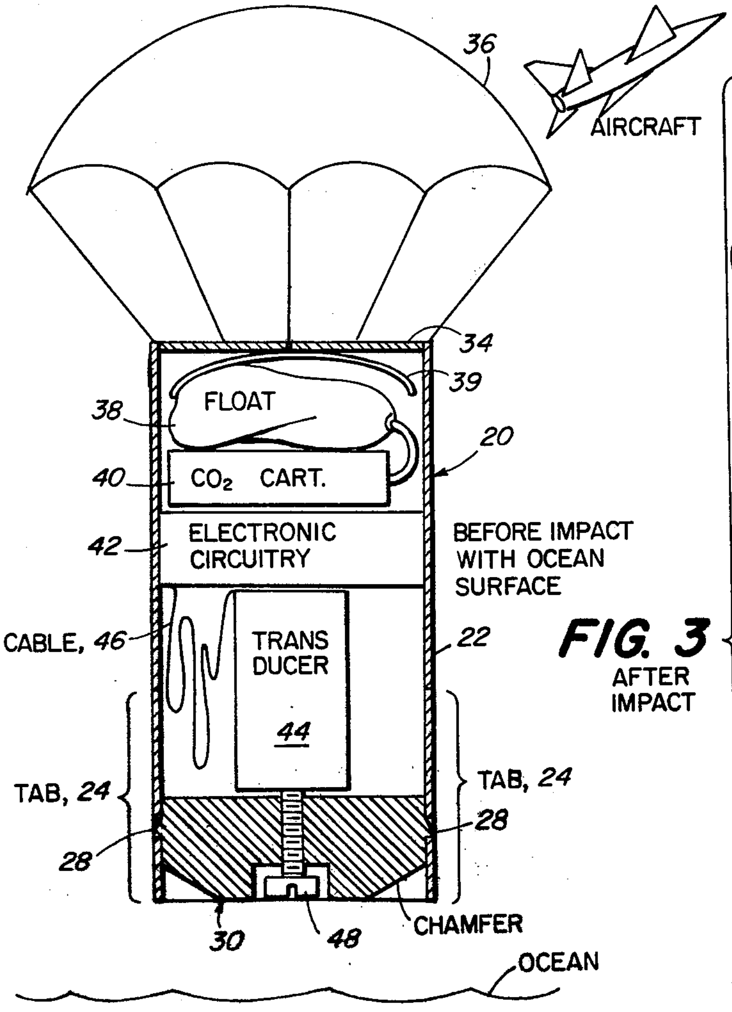
FIG. 1
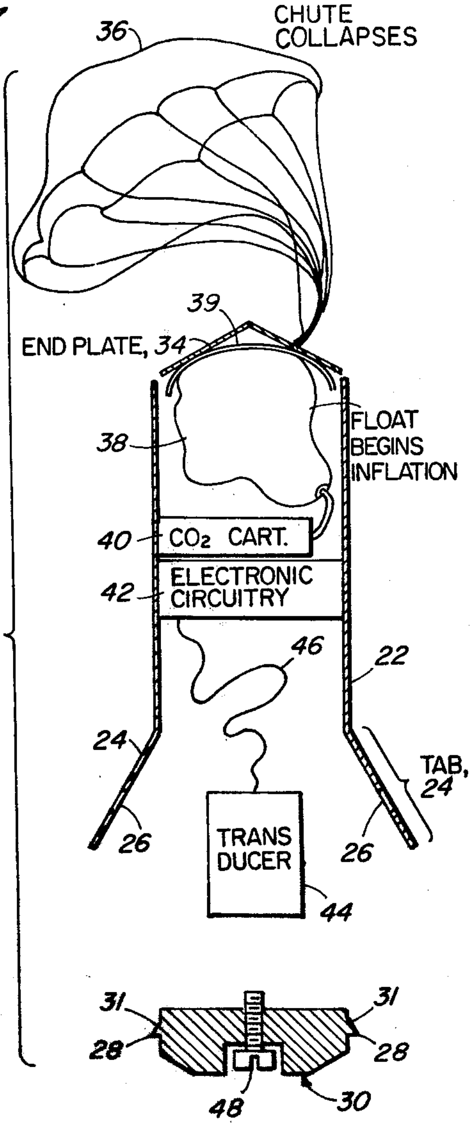
FIG. 3
AFTER
IMPACT
FIG. 2
DURING
IMPACT
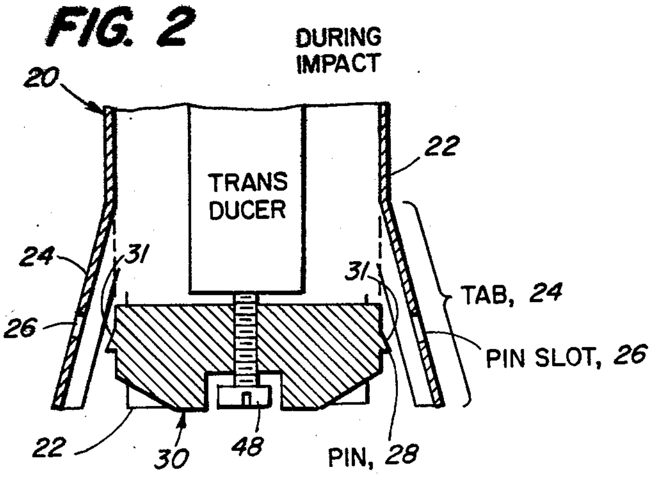
FIG. 4
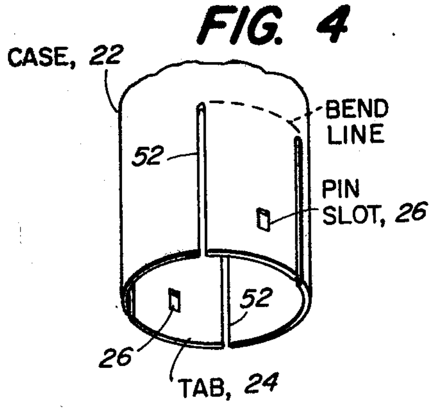

TRANSDUCER HOUSING WITH RELEASE MECHANISM

BACKGROUND OF THE INVENTION

Sonar transducers are sometimes dropped from aircraft for deployment at remote sites in the ocean. The transducers are enclosed in a sturdy case which protects the transducer with its associated electrical circuitry during handling and stowage. Upon impact with the water, the case opens to eject the transducer.

A problem arises in that devices of the prior art for opening the case have been composed of a number of components resulting in additional complexity and reduced reliablity to a sonar system.

SUMMARY OF THE INVENTION

The aforementioned problem is overcome and other advantages are provided by a sonar transducer housing which, in accordance with the invention, comprises a case and cover plate, the cover plate having pins thereon for engaging tabs on the case, the cover plate further having chamfers for directing the force of an impact with the water outwardly against the tabs to force them off the pins thereby releasing the cover plate. The surface of the tabs is flush with that of the housing to facilitate stowage and launching of the housing with the transducer therein.

BRIEF DESCRIPTION OF THE DRAWINGS

The aforementioned aspects and other features of the invention are explained in the following description taken in connection with the accompanying drawings wherein:

FIG. 1 shows a diagrammatic sectional view of a housing of the invention supported by a parachute as it falls toward the ocean, the housing enclosing a transducer with its electronic circuitry;

FIG. 2 shows a diagrammatic sectional view of a portion of the housing of FIG. 1 having the separation device at the moment of impact with the water, the tabs of the separation device being shown as forced apart from a cover plate;

FIG. 3 shows the housing and transducer of FIG. 1 after the impact, an inflating float being seen to deform an end plate at the top of the housing while the cover plate falls away from the bottom of the housing; and FIG. 4 is a dimetric view of the bottom of a case of the housing showing the tabs prior to insertion of the cover plate.

DESCRIPTION OF THE PREFERRED EMBODIMENT

Referring now to the FIGS. 1–4, a housing 20, in accordance with the invention, comprises a case 22 having a pair of tabs 24 with slots 26 for engaging pins 28 extending outwardly from a cover plate 30 which is shown in section. The case 22, the front portion thereof being deleted in FIGS. 1–3 to show the interior of the housing 20, has a circular cylindrical shape and the cover plate 30 has a circular shape for mating with the bottom end of the case 22. The bottom surface of the plate 30 has a chamfer 32 which, upon impact with the surface of the ocean water, directs the force of the water against the tabs 24 to drive the tabs 24 apart and off the pins 28 to free the plate 30. The upper surface 31 of the pins 28 is inclined for urging the tabs 24 apart to permit insertion of the plate 30 into the bottom end of the case 22.

A deformable end plate 34 closes off the top of the housing 20, and a parachute 36 is secured to the plate 34 for slowing its descent during a drop from an aircraft. The housing encloses a deflated float 38 having a protective cap 39 positioned underneath the plate 34, a carbon dioxide cartridge 40 which is activated by conventional means upon contact with water to inflate the float 38, electronic circuitry 42, and a transducer 44 coupled by electrical cable 46 to the circuitry 42 which amplifies signals of the transducer 44. A preload bolt 48 in the plate 30 is tightened against the bottom of the transducer 44 to urge the bottom surface of each of the pins 28 against the bottom surface of the slots 26 thereby tightening the plate 30 with a selectable amount of force against the tabs 24. The tightening force of the pins 28 against the tabs 24 is overcome by the forces of impact of the plate 30 with the water.

After impact with the water, the plate 30 and the transducer 44 drop out of the bottom of the case 22 while the expanding float 38 urges the cap 39 upwardly against the plate 34, thereby deforming the plate 34 for releasing tabs (not shown) thereon from the case 22. The plate 34 with the parachute 36 is freed from the case 22 while the float 38 exits from the top of the housing 20 for supporting the case 22 at the surface of the water. Inlet holes (not shown) in the case 22 admit water to the interior of the case 22 for activating the cartridge 40. An antenna 50 is supported above the water by the float 38 to be in radio contact with the aircraft, the antenna 50 being coupled to the circuitry 42, as is the transducer 44, so that signals of the transducer 44 are communicated to the aircraft.

The housing 20 is provided with a smooth cylindrical surface to facilitate stowage and launching. Accordingly, the tabs 24 are formed directly from the cylindrical surface by cutting slits 52 in the case 22 so that there is no protrusion from the smooth cylindrical surface. The length of a pin 28 is sufficient to produce contact between a pin 29 and a slot 26 with essentially no protrusion of the pins 28 beyond the surface of the tabs 24.

It is understood that the above-described embodiment of the invention is illstrative only and that modifications thereof may occur to those skilled in the art. Accordingly, it is desired that this invention is not to be limited to the embodiment disclosed herein, but is to be limited only as defined by the appended claims.

What is claimed is:

1. A release mechanism for a sonar transducer housing comprising:

said housing having longitudinal slots at an end of said housing, a pair of said slots defining a tab which is bendable, said housing having a plurality of said tabs, each of said tabs having an opening therein; and a cover having pins for engaging said openings, said cover having a chamfer located inwardly of a wall of said housing and being inclined relative to a longitudinal axis of said housing for directing the force of a water impact against said tabs to bend said (tap) tabs away from said cover to separate said tabs from said pins, thereby releasing said cover and said transducer from said housing.

2. A mechanism according to claim 1 wherein said cover includes means for tightening said cover against said tabs with a selectable tightening force.

3. A mechanism according to claim 2 wherein said pins have a surface which is inclined relative to said tabs permitting engagement of said pins in said openings.

4. A mechanism according to claim 1 wherein the outer surfaces of said tabs is flush with an outer surface of said housing, said pins being sufficiently short that there is essentially no protrusion of said pins beyond the surfaces of said tabs.

* * * * *